United States Patent
Nakakawaji et al.

(10) Patent No.: US 10,155,916 B2
(45) Date of Patent: Dec. 18, 2018

(54) LUBRICANT FOR GAS INSULATED SWITCHGEAR, AND GAS INSULATED SWITCHGEAR

(71) Applicant: HITACHI, LTD., Tokyo (JP)

(72) Inventors: Takayuki Nakakawaji, Tokyo (JP); Hiroyuki Akata, Tokyo (JP); Tomohiro Moriyama, Tokyo (JP); Kazuhiro Satou, Tokyo (JP); Makoto Hirose, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/537,989

(22) PCT Filed: Feb. 4, 2016

(86) PCT No.: PCT/IB2016/050556
§ 371 (c)(1),
(2) Date: Jun. 20, 2017

(87) PCT Pub. No.: WO2016/103240
PCT Pub. Date: Jun. 30, 2016

(65) Prior Publication Data
US 2017/0349854 A1   Dec. 7, 2017

(30) Foreign Application Priority Data
Dec. 25, 2014   (JP) .................. 2014-261704

(51) Int. Cl.
*C10M 169/00*   (2006.01)
*C10M 115/08*   (2006.01)
(Continued)

(52) U.S. Cl.
CPC ........ *C10M 169/00* (2013.01); *C10M 107/02* (2013.01); *C10M 115/08* (2013.01);
(Continued)

(58) Field of Classification Search
CPC .................. C10N 2220/022; C10M 2215/28
(Continued)

(56) References Cited

U.S. PATENT DOCUMENTS

| 6,396,018 B1 | 5/2002 | Kinoshita et al. |
| 2011/0127237 A1* | 6/2011 | Uchii ............... H01H 33/22 218/46 |

(Continued)

FOREIGN PATENT DOCUMENTS

| JP | 50-030645 B1 | 10/1975 |
| JP | 56-032594 A | 4/1981 |

(Continued)

OTHER PUBLICATIONS

International Search Report, PCT/IB2016/050556, dated Apr. 26, 2016, 2 pgs.

*Primary Examiner* — Vishal V Vasisth
(74) *Attorney, Agent, or Firm* — Volpe and Koenig, P.C.

(57) ABSTRACT

Provided is a lubricant for a gas insulated switchgear, with which properties of a base oil such as heat resistance, evaporation loss, fluidity under a low temperature, and chemical stability (oxidation resistance and HF resistance) are balanced at a level higher than the conventional level, and long service life and high reliability of the gas insulated switchgear are achieved. A lubricant for a gas insulated switchgear according to the present invention, contains: a base oil containing a polyalphaolefin having a kinematic viscosity at 40° C. of 50 mm$^2$/s or more; and a thickener containing bisamides.

4 Claims, 4 Drawing Sheets

(51) Int. Cl.
*C10M 125/02* (2006.01)
*H01H 33/64* (2006.01)
*C10M 169/02* (2006.01)
*C10M 107/02* (2006.01)
*C10M 125/22* (2006.01)
*H02B 7/01* (2006.01)

(52) U.S. Cl.
CPC ........ *C10M 125/02* (2013.01); *C10M 125/22* (2013.01); *C10M 169/02* (2013.01); *H01H 33/64* (2013.01); *H02B 7/01* (2013.01); *C10M 2201/041* (2013.01); *C10M 2201/066* (2013.01); *C10M 2201/102* (2013.01); *C10M 2201/1026* (2013.01); *C10M 2203/1065* (2013.01); *C10M 2205/0206* (2013.01); *C10M 2205/0285* (2013.01); *C10M 2207/1256* (2013.01); *C10M 2215/08* (2013.01); *C10M 2215/28* (2013.01); *C10N 2230/02* (2013.01); *C10N 2230/06* (2013.01); *C10N 2230/08* (2013.01); *C10N 2230/10* (2013.01); *C10N 2230/74* (2013.01); *C10N 2240/20* (2013.01); *C10N 2250/10* (2013.01)

(58) Field of Classification Search
USPC .................................................. 508/110, 528
See application file for complete search history.

(56) References Cited

U.S. PATENT DOCUMENTS

2015/0024980 A1\* 1/2015 Arai ..................... C10M 169/06
508/155
2015/0024981 A1\* 1/2015 Ayame ................ C10M 169/06
508/155
2015/0232778 A1 8/2015 Arai et al.

FOREIGN PATENT DOCUMENTS

| JP | 2001-101943 A | | 4/2001 | |
|---|---|---|---|---|
| JP | WO 2013133148 A1 | \* | 9/2013 | .......... C10M 169/06 |
| WO | 2010/079743 A1 | | 7/2010 | |
| WO | 2011/086902 A1 | | 7/2011 | |
| WO | 2014/034761 A1 | | 3/2014 | |

\* cited by examiner

LUBRICANT FOR GAS INSULATED SWITCHGEAR, AND GAS INSULATED SWITCHGEAR

This application is a 371 of PCT/IB2016/050556, filed Feb. 4, 2016.

TECHNICAL FIELD

The present invention relates to a lubricant for a gas insulated switchgear, and a gas insulated switchgear.

BACKGROUND ART

A gas insulated switchgear (hereinafter, abbreviated as "GIS") is a switch with which load current of an electric power system or an electric power apparatus is opened and closed, and further accident current or the like is broken to protect the equipment in the load side and to prevent the accident spread in the upstream side. Accordingly, the GIS is an important infrastructure apparatus that supports the stable supply of electric power. In a tank of a GIS, a lubricant such as grease and wax is used for the sliding parts of electrodes, and a mechanism part for operating the electrodes. The lubricant is used to reduce frictional resistance and abrasion in each of the sliding parts, and required for reliable operation at the time of current breaking.

As a technique of a lubricant to be used for a gas insulated switchgear, for example, there is PTL 1 (JP 50-30645 B). In PTL 1, there is a disclosure of a conductive lubricant that is characterized by including: (a) a mineral oil-based lubricant in a base oil; (b) a high-melting point wax in a thickener; (c) at least one kind selected from powder of an intermetallic compound constituted of at least one kind of element among groups 5 and 6 of the periodic table as the essential component, and graphite powder, in a conductivity imparting agent; and (d) 0.5 to 6% by weight of at least one kind of low polymers of a chloroethylene derivative represented by a predetermined formula in a lubricity improver. A turbine oil as a mineral oil, a high-melting point wax (amide wax, or the like) as a thickener, graphite and $NbS_2$ as a conductivity imparting agent, polyvinyl chloride as a lubricity improver, and the like have been disclosed in PTL 1. The conductive lubricant in PTL 1 is for the purpose of being used in a disconnector of a GIS, and deterioration during the storage period and decrease of the lubrication performance during the long-term use, which were problems of a lubricant in which graphite was dispersed in a mineral oil at that time, have been solved by lubricating waxing.

Further, in PTL 2 (JP 2001-101943 A), there is a disclosure of a power circuit switch comprising: an operating mechanism including a plurality of mechanical sliding parts and configured to open and close contacts; a sliding conduction part configured to electrically connect said contacts with a main circuit on receipt of a connection voltage; and a grease deposited in said mechanical sliding parts of said operating mechanism and said sliding conduction part, wherein said grease contains a base oil including at least one synthetic oil whose kinematic viscosity is 30-500 mm²/s at 40° C. and which is selected from the group consisting of poly α-olefins, poly α-olefin hydrides and dialky diphenyl ethers, and a thickener including 5-30 mass % of a urea compound. According to PTL 2, it is said that a power circuit switch can be provided in which the operating mechanism deterioration of the grease over a period of years, deterioration of the actuation performance due to solidification, and occurrence of operating failures can be suppressed; also a power circuit switch can be provided which is of high reliability, having stable conduction performance over a long period, in which the effect of deterioration due to generation of heat on passage of current in the sliding conduction part is suppressed.

CITATION LIST

Patent Literature

PTL 1: JP 50-30645 B
PTL 2: JP 2001-101943 A

SUMMARY OF INVENTION

Technical Problem

As the problem of a lubricant for a GIS, for example, heat resistance and low evaporation loss of the base oil to the temperature rise of the atmosphere due to the arc generated at the time of current breaking, securing of low-temperature fluidity for realizing reliable operation in a cold district, and the like can be mentioned. Further, the chemical stability to the hydrogen fluoride (HF) that is generated by the decomposition of the sulfur hexafluoride ($SF_6$) gas filled in the GIS tank by the arc discharge at the time of current breaking is also important. In order to secure the reliability of the GIS over a long period of time, it is required to overcome the above problems.

In addition, along with the globalization of the GIS market, there are many situations in which the use environment becomes severe and further the periodic maintenance and conservation become difficult. Therefore, there has been an increasing demand for longer service life and higher reliability of the lubricant for a GIS.

When the use environment of the GIS is assumed, with the lubricant using a mineral oil as the base oil, which is described in PTL 1, it is difficult to satisfy the required performance of the above-described low evaporation loss, low-temperature fluidity, and the like from the viewpoint of the vapor pressure and viscosity index of the mineral oil, and it may be insufficient to secure the high reliability over a long period of time with less deterioration over time. Further, in PTL 1, there is no investigation and evaluation for the low-temperature fluidity at all. It is considered that the low-temperature fluidity is a relatively recent problem along with the increase in the export to cold districts, and was not considered at the time of filing of PTL 1.

In addition, as to the grease in PTL 2, there is no investigation and evaluation for the low-temperature fluidity and the chemical stability at all.

In view of the above circumstances, an object of the present invention is to provide a lubricant for a GIS, with which properties of a base oil such as heat resistance, evaporation loss, fluidity under a low temperature, and chemical stability are balanced at a level higher than the conventional level, and long service life and high reliability of the GIS are achieved.

Solution to Problem

In order to solve the problem, the present invention provides a lubricant for a gas insulated switchgear, containing: a base oil containing a polyalphaolefin having a kinematic viscosity at 40° C. of 50 mm²/s or more; and a thickener containing bisamides.

In addition, another aspect of the present invention provides a gas insulated switchgear, including: a gas circuit breaker; a disconnector; an installation switch; a current transformer; and a main bus, wherein the gas circuit breaker, the disconnector, the installation switch, and the current transformer have sliding parts, and the lubricant for a gas insulated switchgear according to the present invention is applied to the sliding parts.

Advantageous Effects of Invention

According to the present invention, a lubricant for a GIS, with which properties of a base oil such as heat resistance, evaporation loss, fluidity under a low temperature, and chemical stability are balanced at a level higher than the conventional level, and long service life and high reliability of the GIS are achieved, can be provided.

DESCRIPTION OF EMBODIMENTS

For the lubricant to be used in a tank of a GIS, the heat resistance and low evaporation loss to the temperature rise due to the arc at the time of current breaking, and the fluidity and chemical stability (oxidation resistance and HF resistance) under a low temperature are particularly important. Accordingly, for the base oil and the thickener, which constitute a lubricant, the following properties are required. That is, for the base oil, properties such as high heat resistance, low vapor pressure, high viscosity index, and high affinity for a thickener are required. For the thickener, properties such as chemical stability to oxidizing atmosphere and to the HF that is a decomposition product of $SF_6$ gas, and high affinity for a base oil are required.

The present inventors have conducted intensive studies for the composition of a lubricant so as to solve the above-described problems. As a result, it was found that by using a polyalphaolefin having a kinematic viscosity at 40° C. of 50 mm$^2$/s or more as a base oil, and by using bisamides as a thickener, a lubricant for a GIS, with which properties of a lubricant such as heat resistance, evaporation loss, fluidity under a low temperature, and chemical stability to oxidizing atmosphere and to a decomposition product of $SF_6$ gas (HF and the like) are balanced at a level higher than the conventional level, and long service life and high reliability are achieved, can be provided. The present invention is based on the findings described above.

Hereinafter, the embodiments of the present invention will be described in detail. However, the present invention should not be limited to the following embodiments. Note that the "lubricant" in the present invention contains at least a base oil and a thickener, which will be described in detail below, and includes the ones that are generally referred to "grease" and "wax". It depends on the content of the thickener and the kind and content of the additives what state (solid state, semi-solid state, or the like) the lubricant has.

[Lubricant]

(1) Base Oil

As described above, the lubricant of the present invention uses a polyalphaolefin (hereinafter, referred to as poly-α-olefin) having a kinematic viscosity at 40° C. of 50 mm$^2$/s or more as the base oil. The poly-α-olefin is known to be used as a base oil of an engine oil, and the heat resistance is higher and the evaporation loss is less (the vapor pressure is low) as compared with the above-described mineral oil in PTL 1 and the like, therefore, the decrease of the content of the base oil due to heat decomposition or evaporation can be reduced. The structure of poly-α-olefin is represented by the following (Formula 1).

[Chemical formula 1]

$$C_{10}H_{21}\text{---}(\text{CH}\text{---}C_8H_{17}\text{---}CH_2)_n\text{H} \tag{Formula 1}$$

Herein, the kinematic viscosity is changed depending on the number of n (the number of alkyl groups) in (Formula 1). When n=3 or more, the kinematic viscosity at 40° C. becomes 50 mm$^2$/s or more. When the kinematic viscosity is less than 50 mm$^2$/s, evaporation loss is increased, and this is not preferred. When the kinematic viscosity at 40° C. is 50 mm$^2$/s or more, the evaporation loss of the base oil to the temperature rise in a GIS tank due to the arc generation or the like at the time of current breaking can be significantly reduced, and the life prolongation of the lubricant can be realized. Note that the kinematic viscosity of the lubricant of the present invention is based on the JIS standard (JIS K2283).

(2) Thickener

As described above, the lubricant of the present invention uses bisamides as the thickener. Bisamides have higher chemical stability to a decomposition product of $SF_6$ gas as compared with other organic thickeners (urea, PTFE, and the like). In addition, the generated residues (foreign matters derived from the thickener, generated by the decomposition by arc discharge) can be much more reduced as compared with those of an inorganic thickener such as bentonite. Further, the bisamides have high affinity for a poly-α-olefin, and can easily be waxed.

Examples of the bisamides include a saturated fatty acid bisamide (methylenebis(stearamide), ethylenebis(capramide), ethylenebis(lauramide), ethylenebis(stearamide), ethylenebis(isostearamide), ethylenebis(hydroxystearamide), ethylenebis(behenamide), hexamethylenebis(stearamide), hexamethylenebis(behenamide), hexamethylenebis(hydroxystearamide), N,N'-distearyl adipamide, N,N'-distearyl sebacamide, and the like), a unsaturated fatty acid bisamide (ethylenebis(oleamide), hexamethylenebis(oleamide), N,N'-dioleyl adipamide, N,N'-dioleyl sebacamide, and the like), and an aromatic bisamide (m-xylylenebis(stearamide), N,N'-distearyl isophthalamide, and the like).

Among the above-described bisamides, those having high affinity for a poly-α-olefin are preferred. In addition, in consideration that the maximum atmospheric temperature assumed in a GIS tank is around 100° C., it is preferred to use bisamides having a melting point higher than 100° C. In consideration of the affinity for a poly-α-olefin and the melting point, a methylene stearyl bisamide is particularly preferred among the bisamides. The methylene stearyl bisamide has high affinity for a poly-α-olefin and a melting point of 130° C. or more, and can achieve the life prolongation of the lubricant without being melted even under the environment of the maximum atmospheric temperature of 100° C. assumed in a GIS tank. The structure of a methylene stearyl bisamide is represented by the following (Formula 2).

[Chemical formula 2]

(Formula 2)

The affinity between the poly-α-olefin and the bisamides can be evaluated by the difference in the solubility parameter (SP value). When the solubility parameters of a poly-α-olefin and bisamides are largely different, separation occurs in a liquid-liquid mixture of the poly-α-olefin and the bisamides, and the performance as a lubricant may be lowered. Therefore, the difference between the SP values of both is preferably as small as possible. In a case where the molecular weight of the bisamides is excessively large, or the bisamides have a bulky structure such as a structure of an aromatic ring, the balance of the SP values may be lost, and the affinity for the poly-α-olefin may be impaired.

As the grease excellent in the high heat resistance, the low evaporation loss, the fluidity under a low temperature, and the like, a fluorine-based grease including a fluorine oil as the base oil and polytetrafluoroethylene powder (hereinafter, abbreviated as PTFE powder) as the thickener can be mentioned. However, under the environment containing $SF_6$ gas and HF that is a decomposition product of the $SF_6$ gas, the PTFE powder swells (the particle size increases) due to the infiltration of $SF_6$ gas molecules and HF into the PTFE, and it is concerned that the oil separation degree is deteriorated.

On the other hand, lithium soap-based grease using lithium soap as the thickener is widely used in industrial equipment, but lithium soap reacts with fluorine radicals that are decomposition products of $SF_6$ gas to form lithium fluoride, and it is concerned that the performance of the grease is deteriorated (deterioration of oil separation degree).

In the lubricant of the present invention, it is preferred to set the mass mixing ratio of the base oil and the thickener to 85:15 in consideration of the viscosity of the lubricant.

(3) Conductivity Imparting Agent and Lubricity Imparting Agent

The lubricant according to the present invention may further contain a conductivity imparting agent or a lubricity imparting agent as needed. There are multiple sliding parts requiring a lubricant in a GIS. In these sliding parts, there are the portions requiring conductivity and the portions requiring sliding under a heavy load, and the lubricant are required to impart and enhance the performance required in the portions.

As the conductivity imparting agent, for example, graphite powder is preferred, and as the lubricity imparting agent, for example, molybdenum disulfide is preferred.

[Gas Insulated Switchgear]

Figure 6:
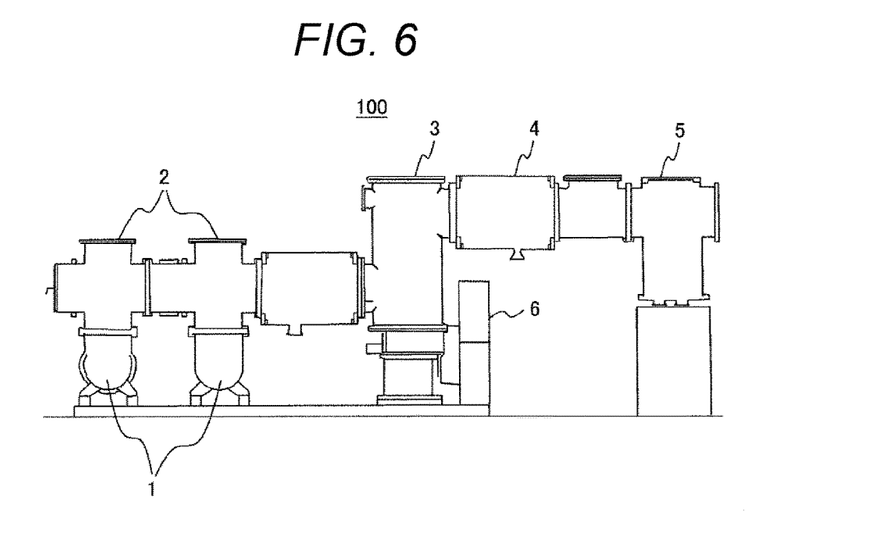
FIG. 6 is a side view schematically showing an example of the gas insulated switchgear according to the present invention.

FIG. 6 is a sectional view schematically showing an example of the gas insulated switchgear according to the present invention. As shown in FIG. 6, the gas insulated switchgear 100 according to the present invention has a main bus 1, a disconnector 2, a gas circuit breaker 3, a current transformer 4, and a cable head 5, and further has an installation switch (not shown) inside the disconnector 2, and these are controlled by a control panel 6. These devices are electrically connected with each other by a high voltage conductor. The high voltage conductor is housed in an electrically insulated state in a sealed container filled with insulation gas ($SF_6$ or the like) for insulation and arc extinction.

The disconnector 2, the gas circuit breaker 3, the current transformer 4, and the installation switch have a constitution of sliding, and the lubricant according to the present invention as described above is applied to these sliding parts. It is preferred to use a lubricant containing a conductivity imparting agent in a portion accompanying energization and sliding. On the other hand, in the vicinity of the arc generating part, since the conductivity imparting agent causes a ground fault, it is preferred to use a lubricant not containing any conductivity imparting agents. The lubricant for a GIS of the present invention is a lubricant with which the heat resistance, the evaporation loss, the fluidity under a low temperature, and the chemical stability of the base oil are balanced at a high level, therefore, long service life and high reliability of the gas insulated switchgear can be achieved.

EXAMPLES

Hereinafter, Examples of the present invention will be described further in detail. However, the present invention should not be limited to the following Examples.
(1) Preparation of Lubricant
(1.1) Preparation of Lubricants of Examples 1 and 2 and Reference Example 1

As a base oil, 85 g of poly-α-olefin (having a kinematic viscosity at 40° C. of 32 mm$^2$/s (Reference Example 1), 68 mm$^2$/s (Example 1), or 100 mm$^2$/s (Example 2)), and 15 g of methylene stearyl bisamide as a thickener were weighed and charged into a beaker, and thoroughly stirred with a magnetic stirrer to disperse the methylene stearyl bisamide to the poly-α-olefin. Next, the beaker in which the poly-α-olefin and the methylene stearyl bisamide had been mixed and stirred was transferred to an oil bath, and heated at a temperature rise rate of 2° C./min while stirring the mixture. When the temperature in the beaker reached 140° C., the methylene stearyl bisamide was dissolved, and the cloudy mixture of poly-α-olefin and methylene stearyl bisamide was turned to the transparent mixture. The beaker was taken out of the oil bath and cooled slowly under a room temperature to obtain a lubricant.

In addition, the "Reference Example" in the present invention is not known because a poly-α-olefin is used as the base oil and a methylene stearyl bisamide is used as the thickener, but the kinematic viscosity at 40° C. is outside the definition of the present invention. Reference Example 1 has been described to show the importance of the kinematic viscosity of the base oil.
(1.2) Preparation of Lubricant of Example 3

Into the lubricant of Example 1, 0.1% by mass of each of graphite powder and molybdenum disulfide was added to obtain a lubricant of Example 3.

(1.3) Preparation of Lubricant of Comparative Example 1

A lubricant of Comparative Example 1 was obtained in the similar manner as in Example 1 except that a naphthenic mineral oil was used instead of the poly-α-olefin as the base oil.

(1.4) Preparation of Lubricant of Comparative Example 2

A lubricant of Comparative Example 2 was obtained in the similar manner as in Example 1 except that bentonite was used instead of the methylene stearyl bisamide as the thickener.

(1.5) Preparation of Lubricant of Comparative Example 3

A lubricant of Comparative Example 3 was obtained in the similar manner as in Example 1 except that a naphthenic mineral oil was used instead of the poly-α-olefin as the base oil, and lithium soap was used instead of the methylene stearyl bisamide as the thickener.

(2) Test and Evaluation (2.1) Heat Resistance Test

TGA (thermogravimetric analysis) measurement was performed for the lubricants of Examples 1 and 2, Reference Example 1, and Comparative Examples 1 and 2, and the temperature ($T_{10}$) at which a weight reduction of 10% was observed was measured. The results are shown in Table 1.

TABLE 1

Weight reduction rate measurement results of Examples 1 and 2, Reference Example 1, and Comparative Examples 1 and 2

| | Lubricant component | | |
| --- | --- | --- | --- |
| | Base oil (kinematic viscosity at 40° C.) | Thickener | $T_{10}$ (° C.) |
| Example 1 | Poly-α-olefin (68 mm²/s) | Methylene stearyl bisamide | 299.6 |
| Example 2 | Poly-α-olefin (100 mm²/s) | Methylene stearyl bisamide | 301.7 |
| Reference Example 1 | Poly-α-olefin (32 mm²/s) | Methylene stearyl bisamide | 275 |
| Comparative Example 1 | Naphthenic mineral oil | Methylene stearyl bisamide | 272 |
| Comparative Example 2 | Poly-α-olefin (68 mm²/s) | Bentonite | 276 |

As shown in Table 1, it is understood that the lubricants of Examples 1 and 2 according to the present invention have $T_{10}$ higher than the $T_{10}$ of the conventional lubricants of Comparative Examples 1 and 2, and are excellent in the heat resistance. The heat resistance of Reference Example 1 is equivalent to that of Comparative Examples 1 and 2.

(2.2) Weight Reduction Rate Measurement Test (Evaporation Loss Evaluation)

Figure 1:
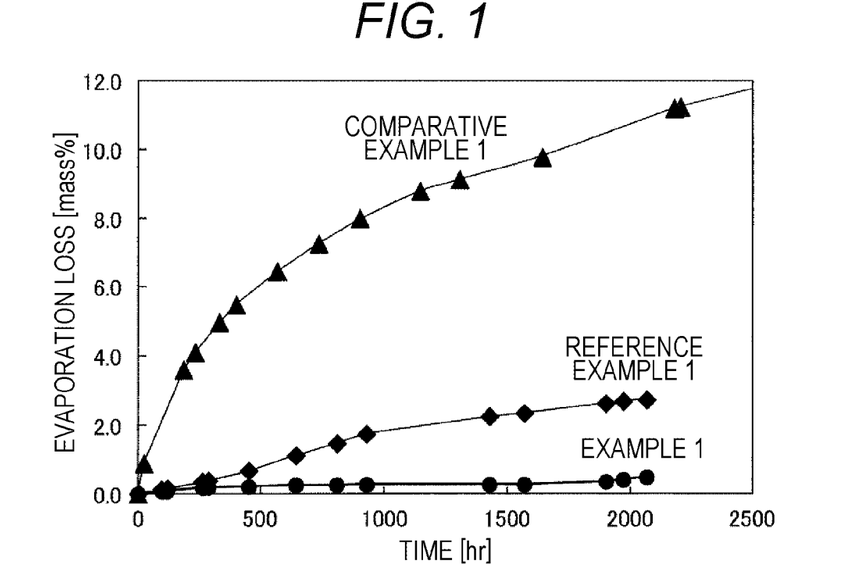
FIG. 1 is a graph showing the relationship between the evaporation loss and the elapsed time of Example 1, Reference Example 1, and Comparative Example 1.

Each of the lubricants of Example 1, Reference Example 1 and Comparative Example 1 was weighed in an amount of 12 g, and placed in a Petri dish, and the evaporation loss (weight reduction rate) to the heating time under the environment of 100° C. in the atmospheric air was measured. For the measurement, a TGA apparatus was used as in the heat resistance test. FIG. 1 is a graph showing the relationship between the evaporation loss and the elapsed time of Example 1, Reference Example 1, and Comparative Example 1. As shown in FIG. 1, in comparison with the results of Comparative Example 1 in which a naphthenic mineral oil was used as the base oil, it is understood that Example 1 has an evaporation loss of 1/20 or less and can maintain the grease performance over a long period of time.

The evaporation loss of Reference Example 1 in which a poly-α-olefin having a kinematic viscosity of 32 mm²/s was used as the base oil is significantly less than that of Comparative Example 1 in which a mineral oil was used (1/5 or less), but is around 4 times that of Example 1, and in this case, it is insufficient to maintain the grease performance over a long period of time.

(2.3) Consistency Measurement Test (Low-Temperature Fluidity Evaluation)

Consistency measurement was performed for the lubricants of Examples 1 and 2, Reference Example 1, and Comparative Examples 1 and 2, and the low-temperature fluidity was evaluated. The consistency of each lubricant at room temperature (17.5° C.) was measured, and then the lubricant was cooled for 24 hours under the environment of −45° C., and the consistency after the cooling was measured. The consistency was measured based on JIS standard (JIS K2220). In addition, a value obtained by subtracting the consistency at room temperature (17.5° C.) from the consistency at −45° C. was determined as the difference. The results are shown in Table 2.

TABLE 2

Consistency measurement results of Examples 1 and 2, Reference Example 1, and Comparative Examples 1 and 2

| | Consistency | | |
| --- | --- | --- | --- |
| | Room temperature (17.5° C.) | After cooling at −45° C. for 24 hours | Difference |
| Example 1 | 214.8 | 183.7 | −31.1 |
| Example 2 | 203.7 | 176.2 | −27.5 |
| Reference Example 1 | 245.6 | 184.1 | −61.5 |
| Comparative Example 1 | 226.3 | 132 | −94.3 |
| Comparative Example 2 | 255.9 | 185.5 | −70.4 |

The smaller the absolute value of the difference shown in Table 2 is, the more excellent the low-temperature fluidity is. As shown in Table 2, in both Examples 1 and 2, the difference was half or less of that in Comparative Examples 1 and 2, and the change in the consistency before and after cooling was smaller as compared with that in Comparative Examples 1 and 2, and it is understood that the low-temperature fluidity is excellent. Accordingly, the lubricant according to the present invention can secure the reliable operation of the GIS under a low temperature environment. Further, the low-temperature fluidity of Reference Example 1 was also inferior to that of Examples 1 and 2, but showed more excellent low-temperature fluidity than that of Comparative Examples 1 and 2.

(2.4) Total Acid Number Measurement (Oxidation Stability Evaluation)

The total acid number of each of the lubricants of Example 1 and Comparative Example 1 was evaluated. Each of the lubricants of Example 1 and Comparative Example 1 was applied to a washed copper plate (having a size of 50 mm×50 mm, and a thickness of 5 mm) so that the film thickness is 2 mm, and heated in an electric furnace at 100° C. in the atmospheric air. During the heating, a part of the lubricant was collected at predetermined time intervals, and the total acid number was measured by a potentiometric titrator. The total acid number was measured based on JIS K 2501-2003.

Figure 2:
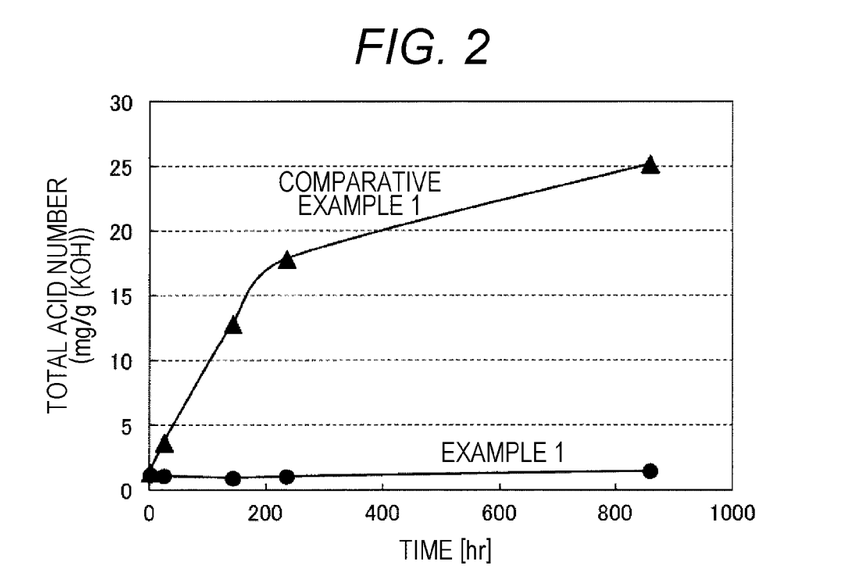
FIG. 2 is a graph showing the relationship between the total acid number and the elapsed time of Example 1 and Comparative Example 1.

FIG. 2 is a graph showing the relationship between the total acid number and the elapsed time of Example 1 and Comparative Example 1. As shown in FIG. 2, the total acid number of the lubricating wax of Example 1 according to the present invention is extremely low (1/10 or less after the lapse of 800 hours) as compared with that of Comparative Example 1 in which a naphthenic mineral oil was used as the base oil, and it is understood that the lubricating wax of Example 1 is excellent in the oxidation resistance stability.

(2.5) FT-IR Measurement (Chemical Stability Evaluation)

The chemical stability to the HF that is a decomposition product of $SF_6$ gas in Example 1 and Comparative Example 3 was evaluated. Each of the lubricants of Example 1 and Comparative Example 3 was applied to an acrylic plate (having the size of 30 mm×50 mm, and the thickness of 0.5 mm) so that the film thickness is 0.3 mm, and arranged in a pressure vessel. Gas in a tank of the GIS in which the interruption test had been performed was collected and analyzed, as a result of the analysis, 226 ppm of HF was measured. The gas in this tank was charged into the pressure container of the above-described lubricant, and after being left to stand for 18 days, the sample was taken out and the change of the molecular structure was measured by FT-IR (Fourier transmission infrared).

Figure 3A:
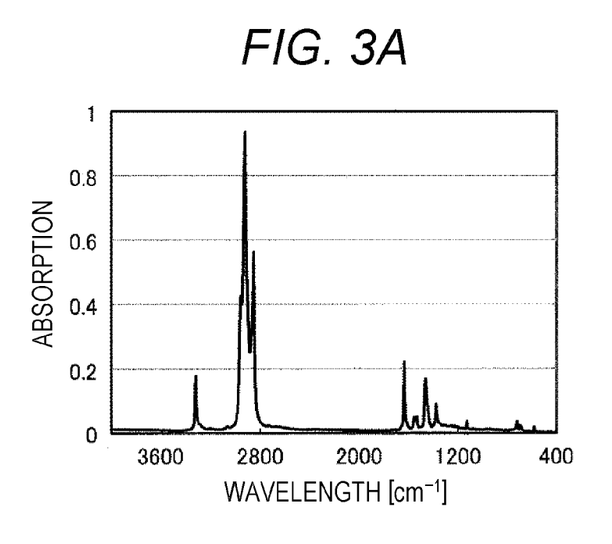
FIG. 3A is a FT-IR spectrum of a lubricant of Example 1.
Figure 3B:
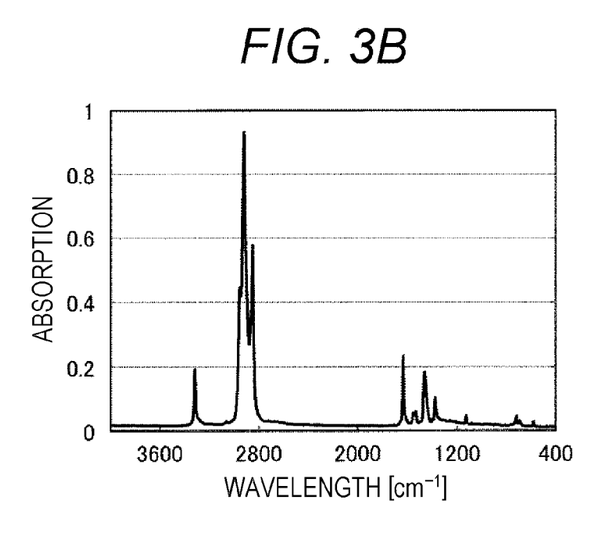
FIG. 3B is a FT-IR spectrum of a lubricant of Example 1 after the lapse of 18 days.
Figure 4A:
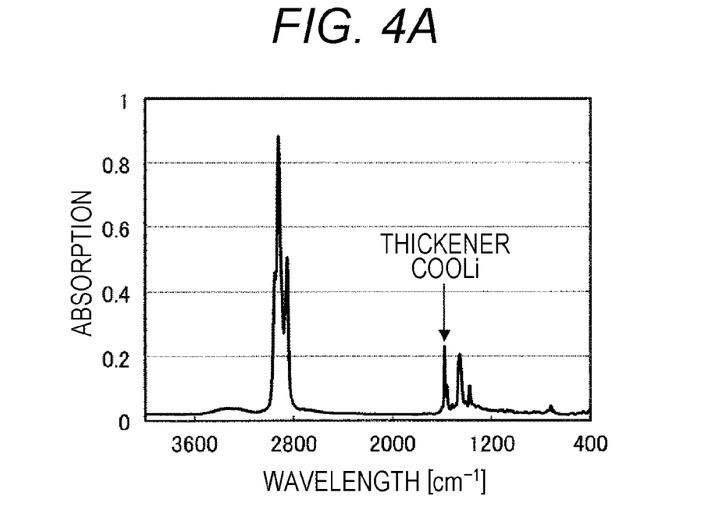
FIG. 4A is a FT-IR spectrum of a lubricant of Comparative Example 3.
Figure 4B:
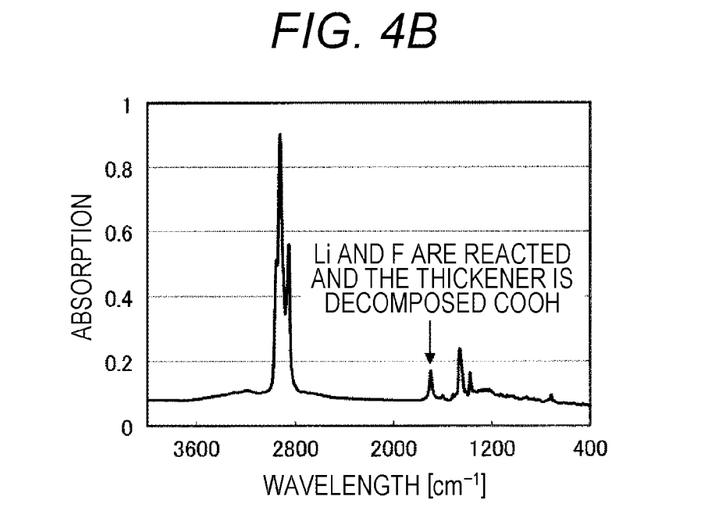
FIG. 4B is a FT-IR spectrum of a lubricant of Comparative Example 3 after the lapse of 18 days.

FIG. 3A is a FT-IR spectrum of the lubricant of Example 1, and FIG. 3B is a FT-IR spectrum of the lubricant of Example 1 after the lapse of 18 days. Further, FIG. 4A is a FT-IR spectrum of the lubricant of Comparative Example 3, and FIG. 4B is a FT-IR spectrum of the lubricant of Comparative Example 3 after the lapse of 18 days. As shown in FIGS. 3A and 3B, in the lubricant of Example 1 according to the present invention, any change in the IR spectrum even after the sample had been left to stand for 18 days was not observed, and it is understood that the resistance to HF is high.

On the other hand, as shown in FIGS. 4A and 4B, in the results of Comparative Example 3, lithium contained in the lithium soap that is a thickener was reacted with HF, and decomposition of the lithium soap was confirmed. Therefore, a lithium soap-based grease is not suitable for use in $SF_6$ gas of the GIS. In contrast, it was shown that the lubricant of the present invention is excellent in the chemical stability to the decomposition product of $SF_6$ gas, and is suitable for use in the GIS.

(2.6) Contact Resistance Measurement

In the present measurement, the effect of additives was verified. A brass rod (having a diameter of 30 mm, and a length of 300 mm) on which the lubricant of Example 3 had been applied was inserted in a through hole having a diameter of 30 mm prepared in an aluminum block (having a size of 100 mm×100 mm, and a thickness of 50 mm), and the brass rod was slid back and forth. In addition, in the test, DC 10 A was applied between the brass rod and the aluminum block at all times during the sliding, and the contact resistance during the sliding was measured. Note that the sliding speed was 150 mm/sec and the number of sliding times was 10 times. The results are shown in Table 3.

TABLE 3

Contact resistance measurement results of Examples 1 and 3

| | Contact resistance (μΩ) |
|---|---|
| Example 1 | 1050 |
| Example 3 | 120 |

As shown in Table 3, with the lubricating wax of the present Examples, in which graphite powder and molybdenum disulfide had been added, the contact resistance was lower as compared with that of Example 1 in which addition had not been performed, and it is understood that the effect of preventing heating is high in the contact part. For the portion requiring conductivity and high lubricity in the GIS, the lubricating wax in which graphite powder and molybdenum disulfide have been added is effective.

Figure 5:
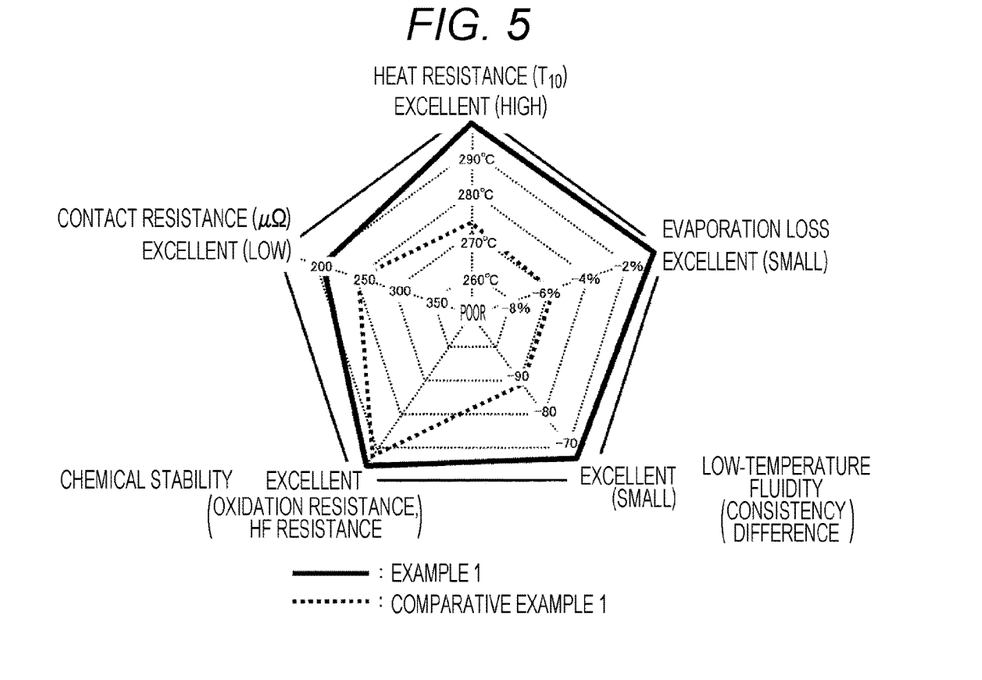
FIG. 5 is a radar chart comparing the characteristics between the lubricants of Example 1 and Comparative Example 1.

FIG. 5 is a radar chart comparing the characteristics of the lubricants of Example 1 and Comparative Example 1. As shown in FIG. 5, the lubricant according to the present invention is more excellent in all the properties of the base oil such as heat resistance, evaporation loss, fluidity under a low temperature, and chemical stability (oxidation resistance and HF resistance) as compared with those in Comparative Example 1 that is a conventional technique, and it is understood that the properties can be balanced at a high level. Further, by adding additives, the contact resistance can be reduced, and the properties of the lubricant can further be improved.

As described above, it has been shown that with the lubricant according to the present invention, properties of the base oil such as heat resistance, evaporation loss, fluidity under a low temperature, and chemical stability to a decomposition product of $SF_6$ gas (HF and the like) are balanced at a level higher than the conventional level, and the lubricant for a GIS, which achieves long service life and high reliability of the GIS, can be provided.

Note that the present invention is not limited to the embodiments described above, but includes various modified examples. For example, the above-described embodiments have been described in detail in order to explain the present invention in a way that is easy to understand, and are not necessarily limited to the ones having all the constitutions described above. In addition, part of the constitutions in a certain Example can be replaced with the constitution in other Example, and further, in the constitution in a certain Example, the constitution in other Example can be added. Moreover, as to the part of the constitutions in each of Examples, addition of other constitutions, and deletion or replacement of the constitutions can be performed.

REFERENCE SIGNS LIST

1 Main bus
2 Disconnector
3 Gas circuit breaker
4 Current transformer
5 Cable head
6 Control panel
100 Gas insulated switchgear

The invention claimed is:

1. A lubricant for a gas insulated switchgear, comprising:
a base oil containing a polyalphaolefin having a kinematic viscosity at 40° C. of 50 mm²/s or more; and a thickener containing methylene stearyl bisamide, wherein the lubricant has chemical stability in the presence of a decomposition product of $SF_6$ gas.

2. The lubricant for a gas insulated switchgear, according to claim 1, wherein at least one kind of a conductivity imparting agent and a lubricity imparting agent is contained.

3. The lubricant for a gas insulated switchgear, according to claim 2, wherein the conductivity imparting agent is graphite powder, and the lubricity imparting agent is molybdenum disulfide.

4. A gas insulated switchgear, comprising:
a gas circuit breaker;
a disconnector;
an installation switch;

a current transformer; and
a main bus,
wherein the gas circuit breaker, the disconnector, the installation switch, and the current transformer have sliding parts, and
the lubricant for a gas insulated switchgear according to claim 1 is applied to the sliding parts.

\* \* \* \* \*